United States Patent [19]

Pinson

[11] Patent Number: 4,812,030

[45] Date of Patent: Mar. 14, 1989

[54] CATOPTRIC ZOOM OPTICAL DEVICE

[75] Inventor: George T. Pinson, Huntsville, Ala.

[73] Assignee: The Boeing Company, Seattle, Wash.

[21] Appl. No.: 929,356

[22] Filed: Nov. 12, 1986

Related U.S. Application Data

[63] Continuation-in-part of Ser. No. 688,535, Jan. 3, 1985, abandoned.

[51] Int. Cl.⁴ .................. G02B 5/10; G02B 17/06; G02B 7/18; G02B 15/16
[52] U.S. Cl. .................................. 350/620; 350/622; 350/624
[58] Field of Search ............... 350/620, 619, 622, 624, 350/623, 429, 444, 443, 442, 505

[56] References Cited

U.S. PATENT DOCUMENTS

| | | | |
|---|---|---|---|
| 2,430,595 | 11/1947 | Young | 350/620 |
| 2,730,004 | 1/1956 | Badger et al. | 88/14 |
| 3,455,623 | 7/1969 | Harris | 350/505 |
| 3,460,886 | 8/1969 | Rumsey | 350/294 |
| 3,527,526 | 9/1970 | Silvertooth | 350/620 |
| 3,887,263 | 6/1975 | Thompson, III | 350/7 |
| 3,915,557 | 10/1979 | Shimojima | 350/429 |
| 3,936,137 | 2/1976 | Litman | 350/174 |
| 3,975,089 | 8/1976 | Betensky | 350/429 |
| 4,179,191 | 12/1979 | Freudenschuss et al. | 350/429 |
| 4,198,129 | 4/1980 | Vochenhuber | 350/429 |
| 4,240,707 | 12/1980 | Wetherell et al. | 350/294 |
| 4,278,330 | 7/1981 | Buchroeder | 350/411 |
| 4,318,089 | 3/1982 | Frankel et al. | 340/567 |
| 4,407,567 | 10/1984 | Michelet et al. | 350/442 |
| 4,445,756 | 5/1984 | Komoto | 350/429 |

FOREIGN PATENT DOCUMENTS

| | | | |
|---|---|---|---|
| 648931 | 11/1977 | U.S.S.R. | |
| 593173 | 2/1978 | U.S.S.R. | 350/620 |
| 2083645 | 3/1982 | United Kingdom . | |

Primary Examiner—Jon W. Henry
Attorney, Agent, or Firm—Finnegan, Henderson, Farabow, Garrett & Dunner

[57] ABSTRACT

A catoptric zoom optical device comprising a plurality of axially-spaced reflectors disposed in a set for receiving and reflecting energy from an object in the ultraviolet through infrared spectrum to generate a real image of the object and support and drive apparatus for selectively varying the effective focal length of the reflector set to magnify the image and for selectively varying the axial distance between the reflector set and a detector of the image for focusing the image on the detector.

14 Claims, 7 Drawing Sheets

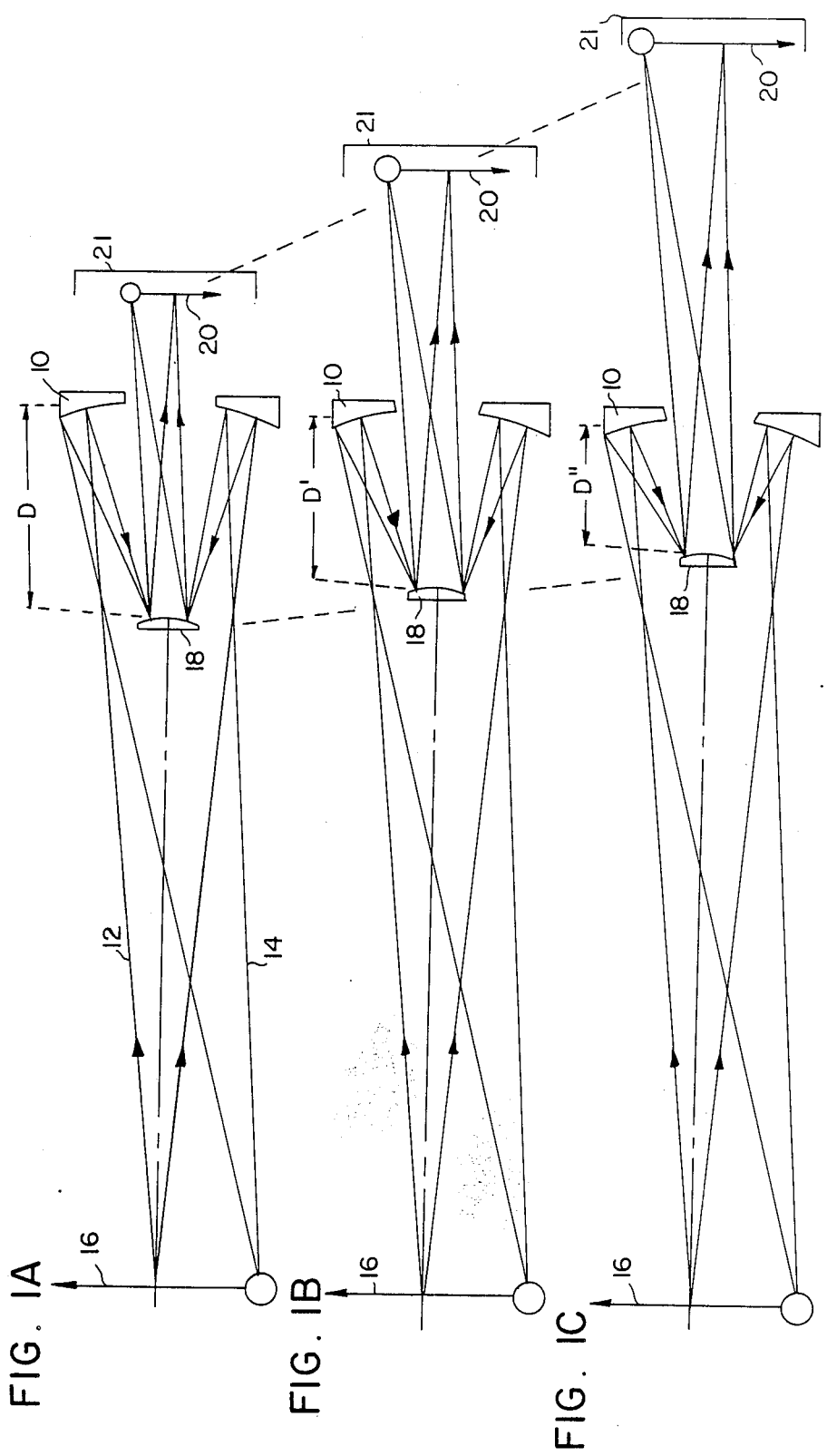

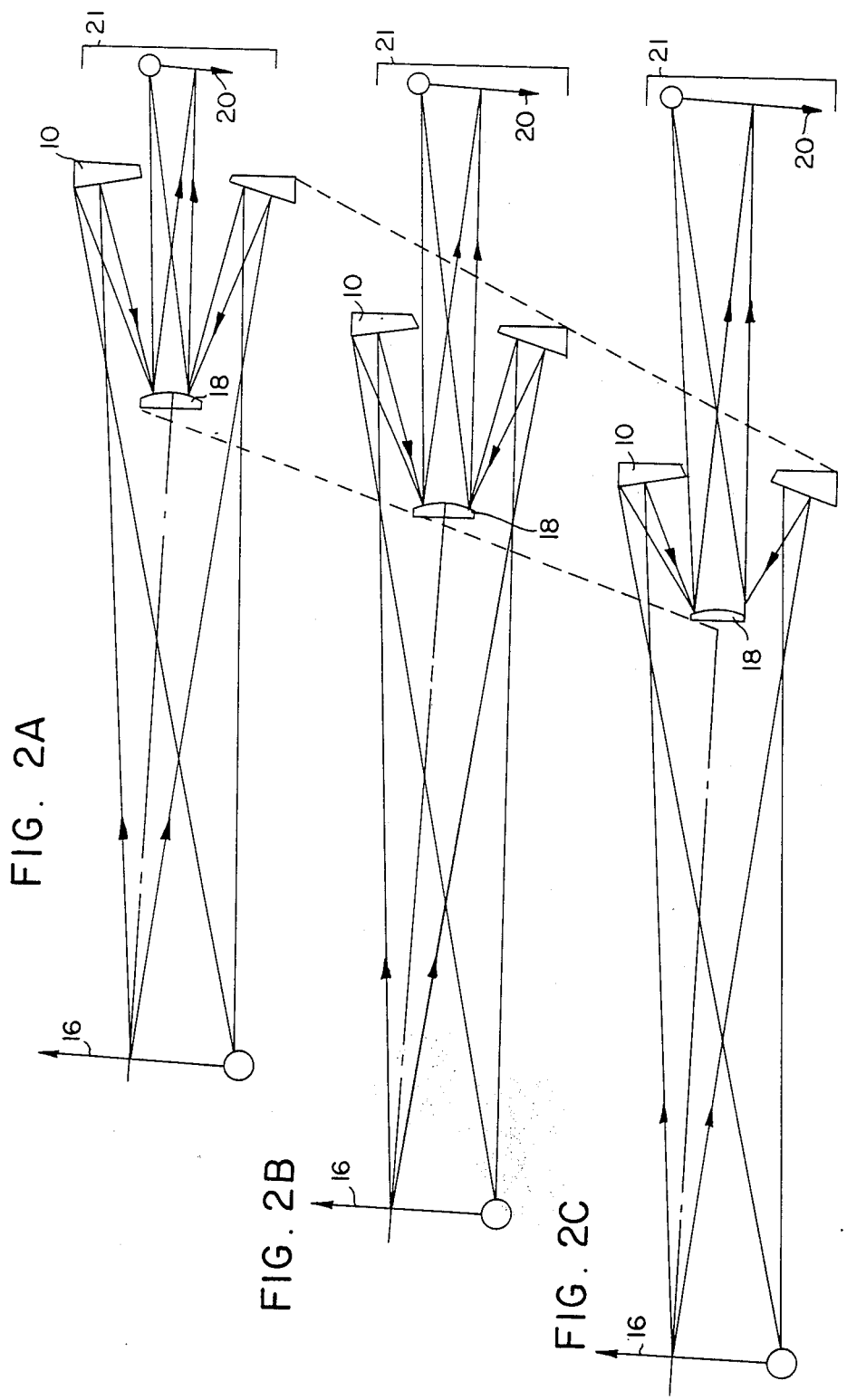

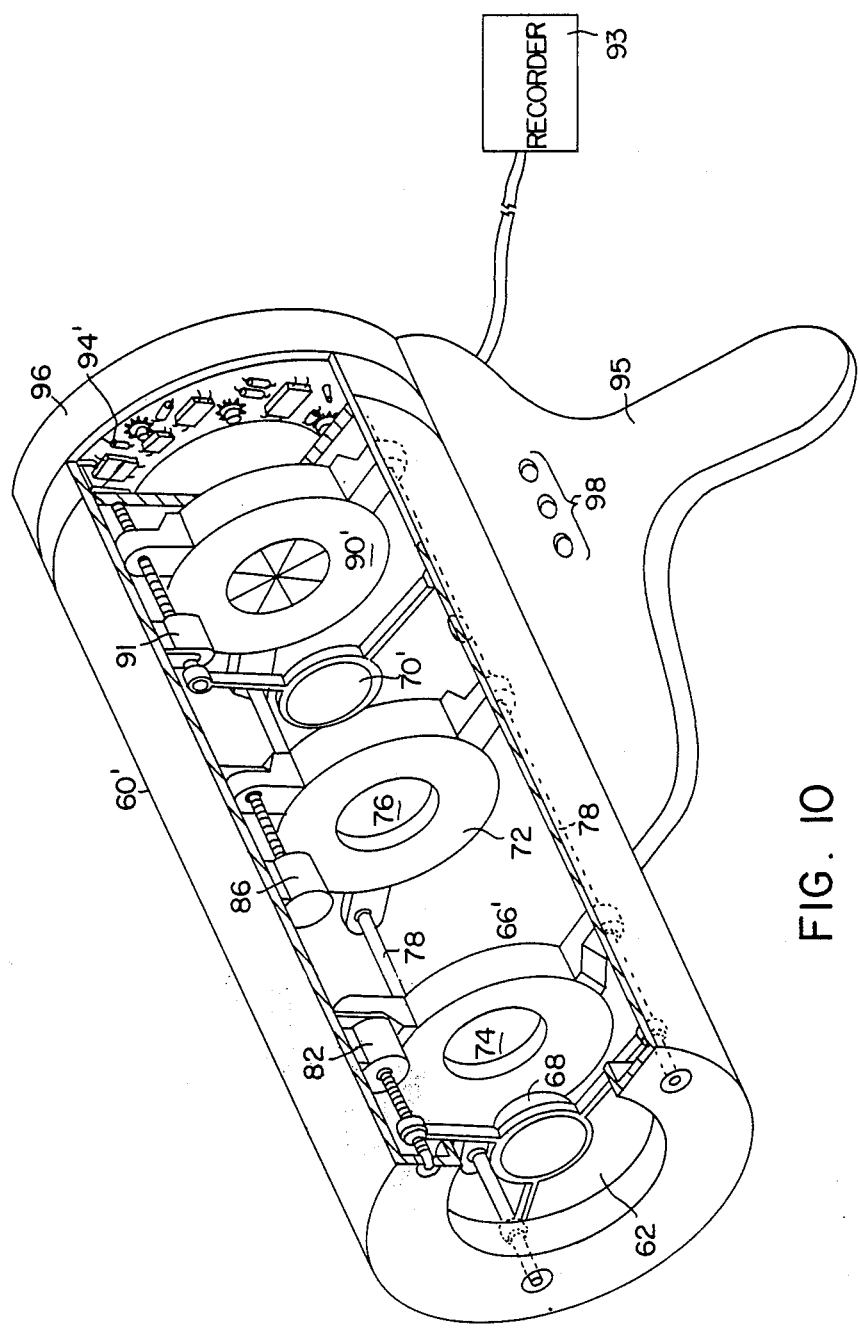

CATOPTRIC ZOOM OPTICAL DEVICE

RELATED APPLICATIONS

This application is a continuation-in-part of the inventor's application Ser. No. 06/688,535, filed Jan. 3, 1985, now abandoned.

BACKGROUND OF THE INVENTION

1. Field of the Invention

This invention relates to a device for magnifying and focusing an image. More particularly, the invention relates to a catoptric zoom optical device, that is an optical device incorporating only reflective elements the effective focal length of which is selectively variable for selectively magnifying an image of an object emitting or reflecting energy in wavelengths from ultraviolet through infrared.

2. Description of the Prior Art

Heretofore, zoom optical devices have used multiple refractive lenses or a combination of refractive lenses and reflective elements to achieve selectively magnified images while correcting for chromatic and monochromatic aberrations. Use of refractive lenses in such devices reduces the amount of energy that reaches a detector element and introduces chromatic aberrations. For example, each lens results in energy intensity losses because of surface reflections and because of absorption as the energy travels through the lens material. These losses are typically substantial.

The prior art zoom optics generally work very well in energy frequency bands in which the selected lens materials are transmissive, but these zoom optical devices suffer from the disadvantage of being heavy and bulky. In addition, these devices generally require large lens diameters to increase the amount of energy focused on the detector while compensating for reflection and absorption losses.

In the long infrared wavelength spectrum, lens materials, such as flint glass, are not transparent. Thus, to obtain a refractive system sensitive to infrared energy, lenses made of exotic materials, such as silicon, germanium or sodium chloride, must be used. These materials are somewhat transparent at infrared wavelengths, but reflective losses still occur at each lens surface and absorbtion losses occur as the energy travels through the lens material. Moreover, infrared optical systems are expensive to manufacture, are delicate and may require special protection when they are used in different environments.

Refractive zoom optical systems are used to provide a change in the field of view and correspondingly a change in the magnification of an image. Since the focal point for two different wave lengths of light is different for a given refractive design, careful attention must be paid to the selection of lens materials and to the figure of the various lens to reduce chromatic aberration to an acceptable level. In addition to chromatic aberration, as the wavelength of the radiation varies, e.g., as the wavelength shortens to ultraviolet and beyond or lengthens to infrared on the other end of the spectrum, energy attenuation as the incoming radiation passes through lens elements becomes important. It is, in general, not possible with currently known lens materials to use a single material with ultraviolet, visible and infrared parts of the spectrum.

A reflective device provides two major advantages over refractive designs. First, reflective elements are free of chromatic aberration. This permits all wavelengths from ultraviolet to infrared to be focused at the same point. Secondly, although the reflectivity of mirror coatings may change with wavelength, a mirror is not subject to absorbtivity since the electromagnetic energy does not pass through the material.

The subject invention provides a zoom optical device capable of selectively magnifying the image of an object emitting energy in wavelengths from ultraviolet through infrared without the many disadvantages in cost and construction of the prior art devices.

SUMMARY OF THE INVENTION

The objects and advantages of the invention may be realized and obtained by means of the instrumentalities and combinations particularly pointed out in the appended claims.

The catoptric zoom optical device of the invention comprises reflector set means for transforming received object energy into a real image of the object, the set means including a plurality of axially-spaced reflector means for receiving and reflecting the object energy. The device of the invention further comprises magnifying means for selectively varying the focal length of the reflector set means and focusing means for selectively varying the axial distance between the reflector set means and a detector for the image.

Preferably, the magnifying means comprises means for selectively varying the relative axial spacing between the reflector means.

In the preferred embodiment, the focusing means comprises means for axially moving the reflector set means relative to the detector. Alternatively, the focusing means may comprise means for axially moving the detector relative to the reflector set means.

The invention preferably includes means responsive to a selected level of magnification for controlling the magnifying and focusing means.

The invention also contemplates a catoptric zoom optical device comprising a casing having an optical axis extending between axially opposed inlet and outlet openings, a plurality of axially-spaced reflective surfaces coaxially disposed in the casing for receiving object energy through the inlet opening and for reflecting a real image of the object through the outlet opening, means in the casing for axially moving each of the reflective surfaces, means controlling the moving means for selectively changing the axial spacing between reflective surfaces to generate selective variable magnification of the image, and means controlling the moving means for selectively axially displacing the reflective surfaces in fixed relative relation to focus the image proximate the outlet opening.

In the preferred embodiment, the casing includes means for guidably supporting each reflective surface and reversable motor means drivingly engaging each reflective surface for axially moving it along the supporting means.

Preferably, the changing and displacing means includes microprocessor means for determining the appropriate axial position of the reflective surfaces to generate a focused image of desired magnification.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A, 1B and 1C are schematic representations of an embodiment of the invention in different operative relationships.

FIGS. 2A, 2B and 2C are schematic representations of another embodiment of the invention in different operative relationships.

FIG. 10 is a partially cutaway perspective view of another embodiment of the invention.

DETAILED DESCRIPTION OF THE PREFERRED EMBODIMENTS

Figure 3A:
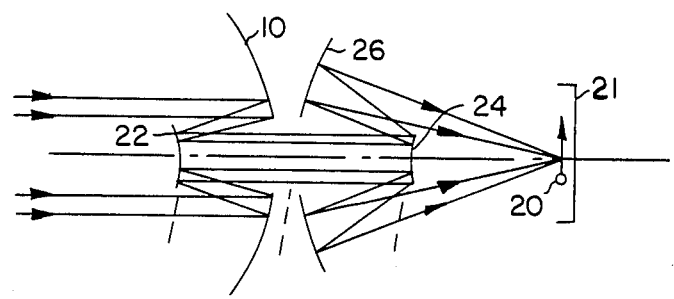
FIGS. 3A, 3B and 3C are schematic representations of a third embodiment of the invention in different operative relationships.

Reference will now be made in detail to the present preferred embodiments of the invention, examples of which are illustrated in the accompanying drawings.

As used herein, the term "catoptric" refers to a device incorporating only reflective elements and not including any refractive element. The term "optical", as used herein, is intended to encompass energy having wavelengths from ultraviolet through infrared. The term "real image" is used in its traditional sense, i.e., the image is real if the rays emerging from the optical system form a convergent beam. The terms "magnifying" and "magnification", as used herein, are intended to encompass both increasing and decreasing the size of an image.

In accordance with the invention, the catoptric zoom optical device comprises reflector set means for transforming received object energy into a real image of said object, said set means including a plurality of axially-spaced reflector means for receiving and reflecting the energy.

As embodied herein and depicted in FIG. 1A, the reflector set means comprises primary reflector 10 disposed to receive energy, represented as rays 12, 14, from object 16 and to reflect that energy to axially-spaced secondary reflector 18 which is disposed to reflect the energy to generate image 20 of object 16.

Primary and secondary reflectors 10, 18 are depicted as spherical reflective surfaces arranged in a simple Cassegrain optical arrangement. It must be understood that the principles of the invention will apply to reflective sets of non-spherical surfaces or combinations of spherical and non-spherical surfaces as in Cassegrain, Newtonian, Gregorian and Schwarzschild optical arrangements. The optical characteristics of such surfaces and arrangements are known and may be selected by one skilled in the art for use in the invention.

The invention is applicable to optical systems using a plurality of reflective surfaces which means any number of two or more reflections or reflectors. The embodiments in FIGS. 1 and 2 depict two reflectors 10, 18 providing two reflections. While all embodiments of the invention will incorporate a primary reflector 10 receiving and reflecting the object energy, a plurality of axially-spaced coaxial secondary reflectors receiving and reflecting in series the energy reflected from the primary reflector 10 may be used in the invention.

Figure 3B:
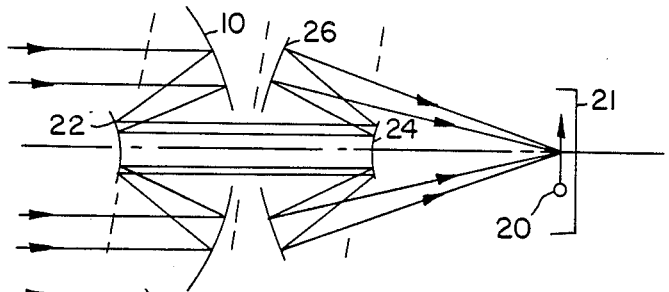
Figure 3C:
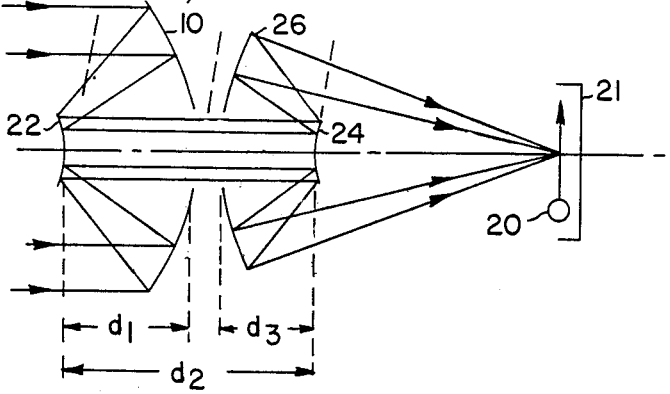

Thus, as seen in FIG. 3, primary reflector 10 reflects object energy to three secondary reflectors 22, 24, and 26 providing four separate reflections.

Figure 4:
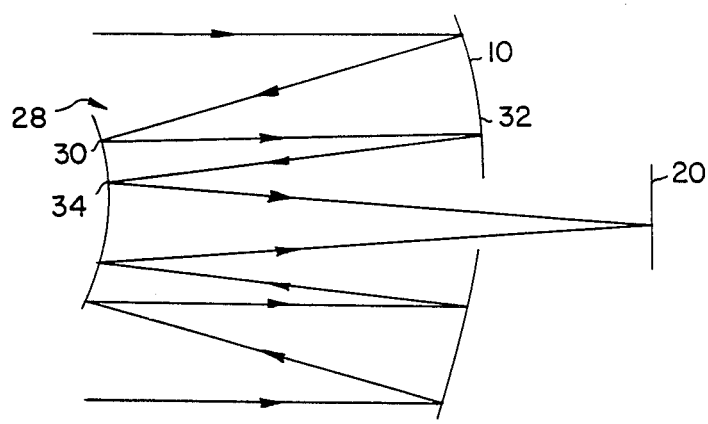

Alternatively, the embodiment depicted in FIG. 4 incorporates two reflectors providing four reflections. The primary reflector 10 reflects energy to secondary reflector 28. Portion 30 of secondary reflector 28 reflects the energy to portion 32 of primary reflector 10 which reflects the energy back to portion 34 of secondary reflector 28 from which image 20 is generated.

Figure 5:
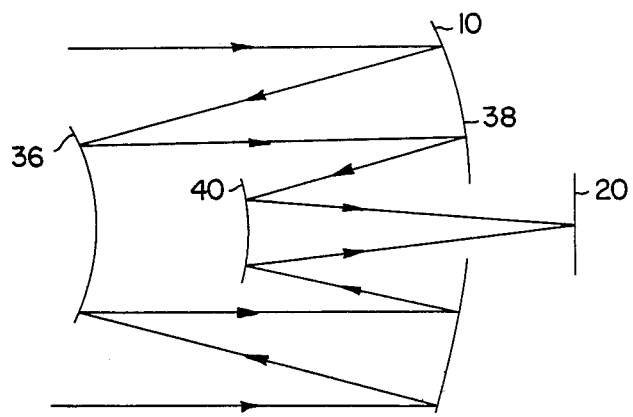
Figure 6:
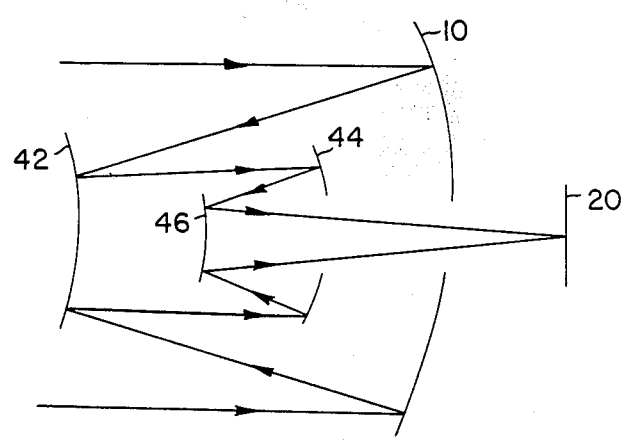

In an alternative arrangement depicted in FIG. 5, primary reflector 10 reflects object energy for reflection in series from first reflector 36, portion 38 of primary reflector 10 and third reflector 40. In the embodiment depicted in FIG. 6, primary reflector means 10 reflects object energy for reflection in series from first reflector 42, second reflector 44 and third reflector 46. In this embodiment, the first, second and third reflectors are each separate reflecting elements.

Figure 7:
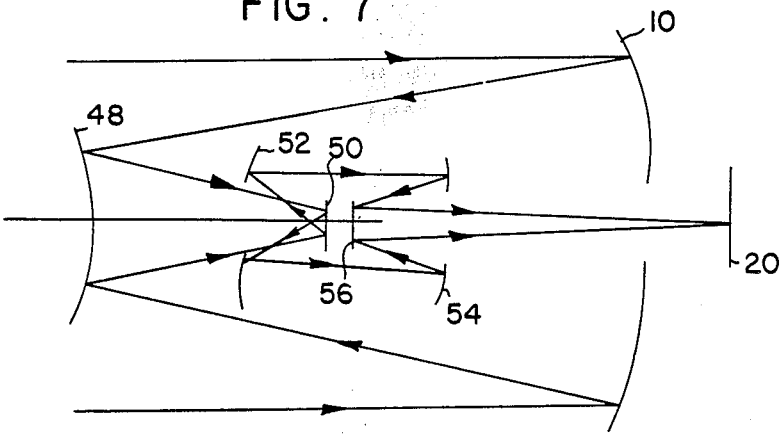
FIGS. 4, 5, 6 and 7 are schematic representations of alternative embodiments of the reflector set of the invention.

Finally, in the embodiment depicted in FIG. 7, primary reflector 10 reflects object energy for reflection in series from first reflector 48, second reflector 50, third reflector 52, fourth reflector 54, and fifth reflector 56. This embodiment incorporates six separate reflectors to generate image 20.

It should be understood that the reflector arrangements depicted in FIGS. 1-7 do not represent the only possible arrangements of reflector elements and reflective surfaces. As apparent to one skilled in the field, increasing the number of reflections effectively increases the ability to modify the focal length of the system and control its physical length. The focal length of a reflective system or set is a function of the focal lengths of the individual reflectors and the distances between the reflectors. The focal length F for a two-reflector Cassegrain arrangement as depicted in FIG. 1A is defined as $$F = \frac{f_1 f_2}{f_1 + f_2 - D} \qquad (1)$$

where:

$f_1$ is the focal length of primary reflector 10, $f_2$ is the focal length of secondary reflector 18, D is the air space or axial space between the reflectors, and F is the equivalent focal length of the reflector system or set.

As the number of reflectors or reflections is increased, the equivalent focal length equation increases in complexity but the principle remains the same. The focal length of the reflector system or set depicted in FIG. 3 is represented by the relationship $$F = \frac{\left(\frac{f_1 f_2}{f_1 + f_2 - d_1}\right)\left(\frac{f_3 f_4}{f_3 + f_4 - d_3}\right)}{\frac{f_2(f_1 - d_1)}{f_1 + f_2 - d_1} + \frac{f_3(f_4 - d_3)}{f_3 + f_4 - d_3} - d_2} \qquad (2)$$

where the individual focal lengths $f_1$, $f_2$, $f_3$ and $f_4$ are the paraxial focal lengths of the individual reflectors 10, 22, 24 and 26, respectively and $d_1$, $d_2$ and $d_3$ are the axial distances between cooperating pairs of reflectors.

The magnification M of a reflective system is defined as the ratio of the angle α of the images between two different zoom positions. Thus, $$\alpha_1 \simeq \frac{h_1}{2F_1} \text{ and } \alpha_2 \simeq \frac{h_2}{2F_2}$$

and magnification is:

$$M = \alpha_1/\alpha_2$$

Since a detector size is constant, the height of the two images is necessarily the same. Thus, where $h_1 = h_2$:

$$M = \left(\frac{F_2}{F_1}\right) \quad (3)$$

where $F_1$ and $F_2$ are the focal lengths of the reflector set at the two zoom positions.

The invention, therefore, operates to magnify the image of the object by selectively changing the focal length of the reflector set. Referring to FIGS. 1A, 1B and 1C, it may be seen that axially moving secondary reflector 18 relative to primary reflector 10 changes the focal length of the reflector set and magnifies image 20. Specifically, the distance D between reflectors 10, 18 in FIGS. 1A is reduced to D' and further reduced to D'' in FIGS. 1B and 1C, respectively. Combining equations (1) and (3) demonstrates that reducing distance D results in a magnified image 20.

For a detector to receive image 20 in focus it is necessary to adjust the axial distance between the reflector set and the detector. Thus, in the embodiment of FIGS. 1A, 1B, and 1C, a detector 21 must axially move relative to fixed primary reflector 10 to properly receive in focus magnified image 20.

FIGS. 2A, 2B and 2C represent an alternative arrangement of the embodiment of FIG. 1. In FIG. 2, secondary reflector 18 is axially moved relative to primary reflector 10 resulting in magnification of image 20 in the same manner as in FIGS. 1A, 1B and 1C. In the embodiment of FIG. 2, however, the reflector set is axially moved relative to detector 21 which is fixed. Thus, magnified image 20 is focused on the fixed detector. In FIGS. 2A, 2B, and 2C, the location of object 16 is depicted as axially moving, but this is only for drawing convenience. Object 16 is normally at infinity.

FIG. 3 depicts a four reflector system the effective focal length of which may be determined by use of equation (2). Magnification of image 20 is achieved by axially moving reflectors 22 and 26 relative to each other and to reflectors 10 and 24. Focusing of magnified image 20 is achieved by axially moving the entire reflector set relative to detector 21 while maintaining the desired axial spacing between the reflectors 10, 22, 24 and 26.

One skilled in the art is fully capable of determining the changes in magnification of an image resulting from changes in axial spacing between reflectors of a set when the characteristics of the individual reflectors are known. It is within the skill in the art to employ various types of reflectors in various combinations and to determine the magnification effect of relative axial movement of the reflectors and the focusing effect of relative axial movement of the reflector set and the detector. The invention lies in application of these principles in a novel device which provides convenient magnification of a real image of an object generating or reflecting energy in the ultraviolet through infrared ranges.

The catoptric zoom optical device of the invention, therefore, further comprises magnifying means for selectively varying the focal length of the reflector set means and focusing means for selectively varying the axial distance between the reflector set means and a detector for the image.

Figure 8:
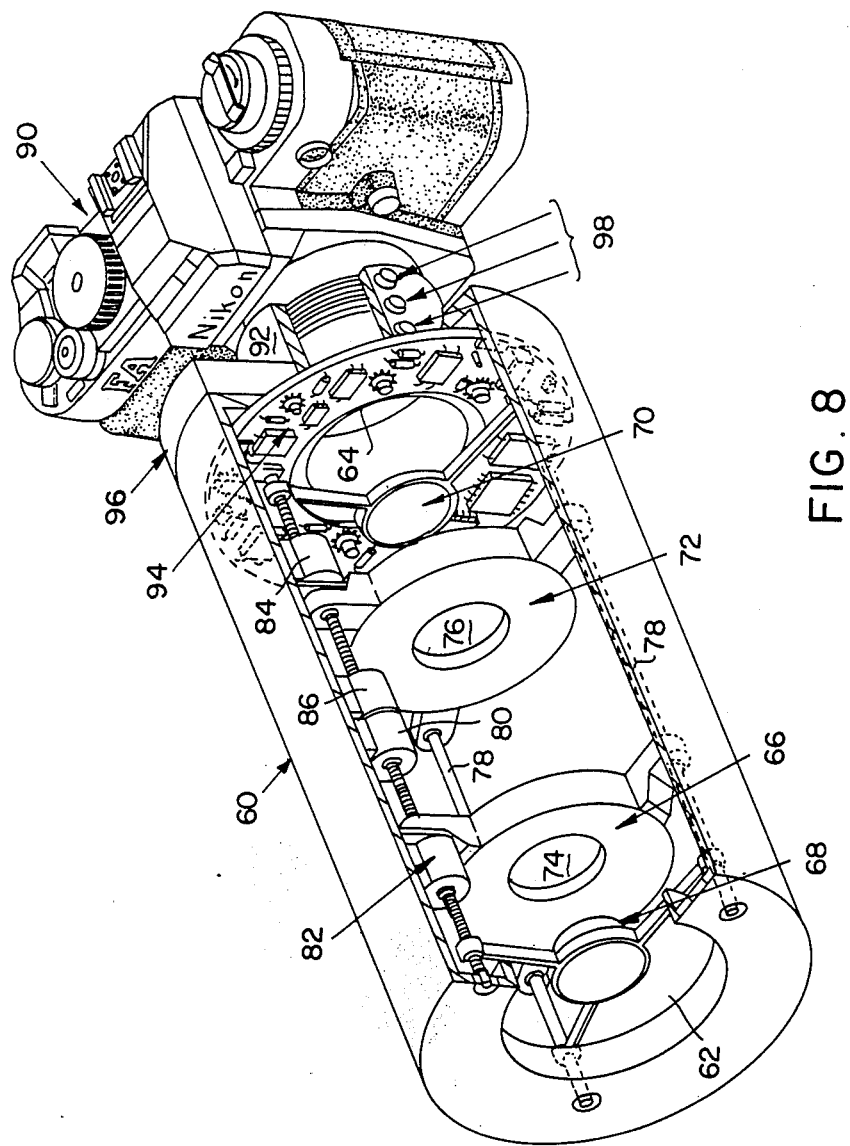
FIG. 8 is a partially cutaway perspective view of a preferred embodiment of the invention affixed to a known detector of energy in the visible wavelength.

In a preferred embodiment depicted in FIG. 8, the catoptric zoom optical device comprises casing 60 having an optical axis extending between inlet opening 62 and outlet opening 64. A plurality of axially-spaced reflective surfaces 66, 68, 70 and 72 are coaxially disposed in casing 60 for receiving object energy through inlet opening 62 and for reflecting a real image of the object through outlet opening 64. The object energy, which may be in the ultraviolet through infrared range, is reflected by the reflective surfaces in a manner similar to that depicted in FIG. 3. The object energy is received by first reflective surface 66 and reflected to second reflective surface 68. This surface is chosen to reflect rays through openings 74, 76 centrally located in first and fourth reflective surfaces 66, 72 to third reflective surface 70. Third reflective surface 70 transforms the parallel rays into diverging rays which are reflected from fourth reflective surface 72 to generate a real image through outlet opening 64.

The magnifying means of the invention comprises means for selectively varying the relative axial spacing between the reflectors of a reflector set. In the embodiment of FIG. 8, reflective surfaces 66, 68, 70 and 72 comprise a reflector set. Each reflective surface is supported in casing 60 for axial movement by guide rods 78. To vary the relative axial spacing between the reflective surfaces, means are provided in the casing for axially moving the surfaces. As depicted in FIG. 8, the moving means comprise reversible drive motors 80, 82, 84 and 86 operatively connected to reflective surfaces 66, 68, 70 and 72, respectively. Each drive motor is fixed inside casing 60 and includes a threaded drive shaft engaging cooperative threaded bores associated with each reflective surface such that rotation of the drive motor axially moves the reflective surface.

The focusing means of the invention comprises means for axially moving one of the reflector set and detector relative to the other. In the embodiment depicted in FIG. 8, the detector 90 is a standard SLR camera for detecting images in the visible light range. The casing 60 includes means for removeably affixing the optical device to a detector, such as internally threaded fitting 92 surrounding outlet opening 64. Thus, in the embodiment of FIG. 8, the detector is fixed and the focusing means comprises means for axially moving the reflector set relative to outlet opening 64 and detector 90. Drive motors 80, 82, 84 and 86 when operated simultaneously will axially move reflector surfaces 66, 68, 70 and 72 as a set with fixed relative spacing, thereby serving to focus the magnified image on the fixed detector.

Alternatively, the device of the invention may include a movable detector and may provide axial movement of only some of the reflectors of the set. Such an embodiment is depicted in FIG. 10 wherein elements common to FIG. 8 have the same numbers. In this embodiment, reflectors 68 and 72 are movably mounted in casing 60 in the same way as depicted in FIG. 8. Reflectors 66' and 70', however, are axially fixed in casing 60. The focal length of the reflector set is adjusted for selective magnification by axial movement of reflectors 68 and 72. Detector 90' is mounted in casing 60 in a manner similar to reflectors 68 and 72 thus permitting selective axial movement of detector 90' by means of motor 91 to focus the magnified image. Detector 90' may be of a type which electrically transmits the detected image to a recorder 93. This arrangement permits manual aiming of the device by means of handle 95 without manual movement of a cumbersome recorder.

Preferably, the catoptric device also includes means for controlling the magnifying and focusing means. Such controlling means should include means responsive to a selected level of magnification for determining the necessary relative axial spacing between the reflective surfaces in the reflector set to obtain the desired magnification and the necessary axial spacing between the reflector set and the detector to focus the magnified image. In the embodiment depicted in FIG. 8, the magnification and focusing means include microprocessor means 94 for controlling the axial position of the reflective surfaces to obtain a desired focused magnification. Similar microprocessor means 94' is used in the embodiment of FIG. 10 to control reflector and detector positions.

Each reflective surface may include a linear potentiometer in communication with the microprocessor to sense and communicate the axial position of the reflective surface. The potentiometer may be incorporated with the drive motor 80, 82, 84 and 86 as in FIG. 8 or may incorporated in casing 60 in any number of known ways to provide an electrical signal to the microprocessor.

The drive motors and microprocessor of the devices depicted in FIGS. 8 and 10 are powered by battery 96.

The devices depicted in FIGS. 8 and 10 may include control buttons for selecting the desired zoom magnification and for focusing the magnified image on the detector. In FIGS. 8 and 10, three manually operable buttons 98 connected to the microprocessor means are disposed on sleeve 92 in FIG. 8 and on handle 95 in FIG. 10.

Figure 9:
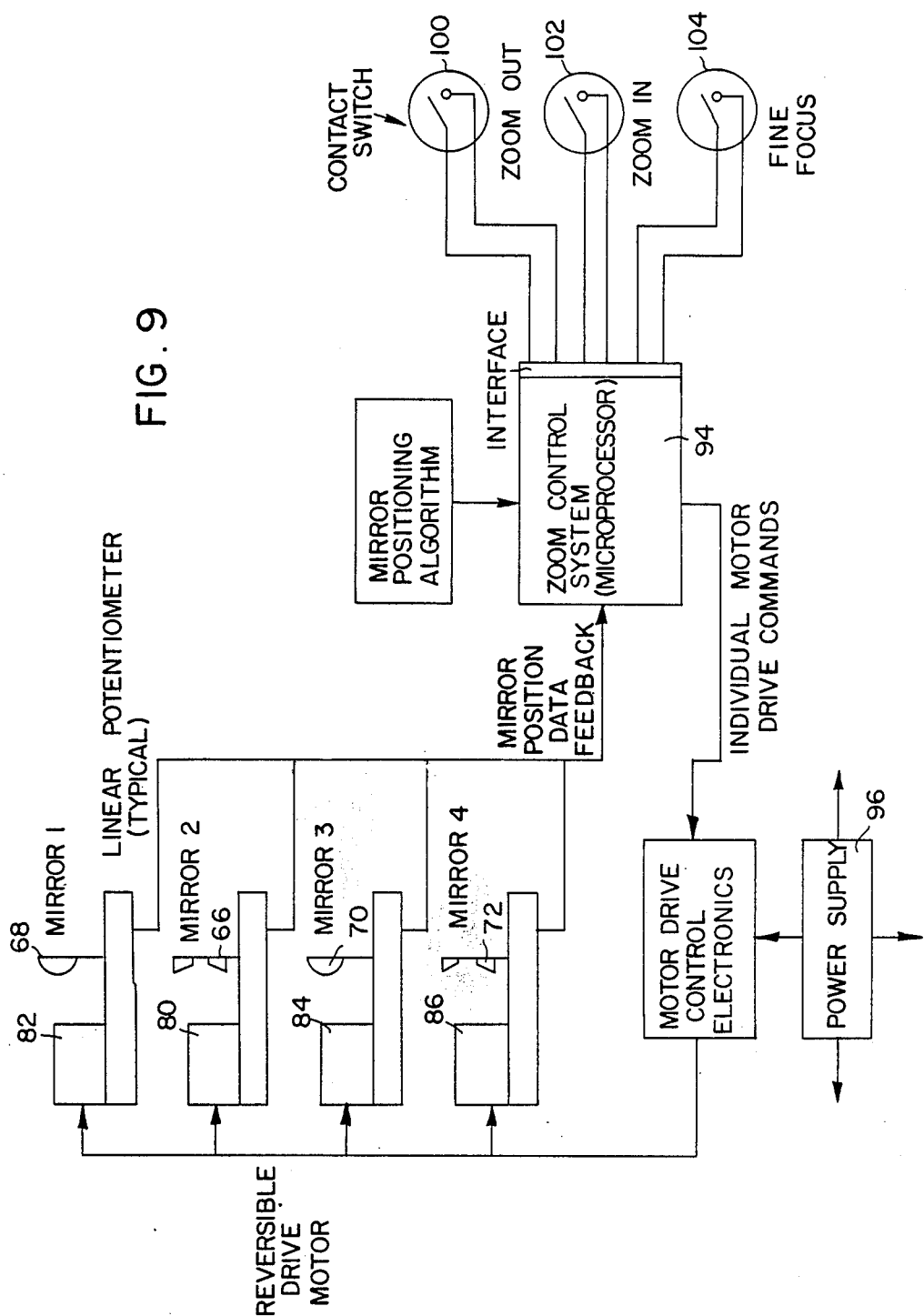
FIG. 9 is a diagrammatic representation of the control circuitry of the embodiment depicted in FIG. 8.

The characteristics of the control means are functionally depicted by the block diagram in FIG. 9. The three manual buttons represent switches 100, 102 and 104. Switches 100 and 102 are electrically connected to microprocessor 94 to communicate the desired magnification of the object's image and the microprocessor generates individual motor drive commands to axially move associated reflective surfaces to obtain the required focal length for the reflector set. Once the desired image magnification and focus is obtained, switch 104 may be activated to simultaneously move all reflective surfaces in fixed relative relation to fine focus the magnified image on the detector. Means for manually selecting the desired magnification, such as switches 100 and 102, are depicted, however, other automatic or electrical means may be substituted. Similarly, the focusing aspect may be manually controlled or may be accomplished through electronic means.

Microprocessor 94 functions in response to an algorithm by which the axial position of each reflective surface is determined. Using the formulas discussed above and other known relationships between reflective surfaces, one skilled in the art would be able to develop an algorithm which defines the required axial position of each reflective surface to effect zooming magnification and focusing of the magnified image on the fixed detector. Similarly, algorithms may be incorporated in microprocessor 94' for determining axial positions of reflective surfaces and movable detector 91 in the embodiment of FIG. 10. The hardware and software of the microprocessors 94, 94' are within the skill of one skilled in the art.

It will be apparent to those skilled in the art that various modifications and variations could be made in the catoptric device of the invention without departing from the scope or spirit of the invention.

What is claimed is:

1. A catoptric zoom optical device comprising:
   reflector set means for transforming received object energy into a real image of said object, said set, means including a plurality of axially-spaced fixed focal length reflectors for receiving and reflecting said energy;
   magnifying means for selectively varying the focal length of said reflector set means; and
   focusing means for selectively varying the axial distance between said reflector set means and a detector for said image.

2. The catoptric device of claim 1 wherein said magnifying means comprises means for selectively varying the relative axial spacing between said reflectors.

3. The catoptric device of claim 1 wherein said focusing means comprises means for axially moving said reflector set means relative to said detector.

4. The catoptric device of claim 1 wherein said focusing means comprises means for axially moving said detector relative to said reflector set means. 5.

5. The catoptric device of claim 1 also including means operatively connected to said magnifying means and to said focusing means for selectively controlling the axial position of each said reflector.

6. The catoptric device of claim 5 wherein said controlling means comprises power means operatively supporting each said reflector means for axially moving said reflectors relative to each other and to said detector, microprocessor means operatively connected to, said power means for directing axial movement of said reflectors to generate a focused image at said detector of desired magnification, and means in communication with said microprocessor means for sensing the axial position of each said reflector.

7. A catoptric zoom optical device comprising:
   a casing having an optical axis extending between axially opposed inlet and outlet openings;
   a plurality of axially-spaced fixed focal length reflective surfaces coaxially disposed in said casing for receiving object energy through said inlet opening and for reflecting a real image of said object through said outlet opening;
   means in said casing for axially moving each said reflective surface;
   means controlling said moving means for selectively changing the axial spacing between said reflective surfaces to generate selectively variable magnification of said image; and
   means controlling said moving means for selectively axially displacing said reflective surfaces in fixed relative relation to focus said image proximate said outlet opening.

8. The catoptric device of claim 7 also including means in said casing for guidably supporting each said reflective surface for axial movement.

9. The catoptric device of claim 8 wherein said moving means for each said reflective surface includes a reversible motor means fixed in said casing and drivingly engaging said reflective surface for axially moving said reflective surface along said supporting means.

10. The catoptric device of claim 9 wherein said motor means includes means for sensing and for communicating to said changing means and said displacing means the axial position in said casing of its respective reflective surface.

11. The catoptric device of claim 10 wherein said changing means and said displacing means comprise microprocessor means disposed in said casing.

12. The catoptric device of claim 11 also including manually operable switch means in communication with said microprocessor means for selectively actuating said changing means and said displacing means.

13. The catoptric device of claim 12 wherein said casing also includes means for fixing a detector of said image in optical alignment with said outlet opening 14. The catoptric device of one of claims 7–13 wherein first, second, third and fourth reflective surfaces are disposed in said casing, said first surface being disposed for receiving said object energy through said inlet opening and reflecting said energy to said second surface axially disposed between said first surface and said inlet opening, said second surface being disposed to reflect said energy through central openings in said first and fourth surfaces to said third surface disposed between said fourth surface and said outlet opening, said third surface being disposed to reflect said energy to said fourth surface axially disposed between said first and third surfaces, and said fourth surface being disposed to reflect an image of said object through said outlet opening.

* * * * *

UNITED STATES PATENT AND TRADEMARK OFFICE
CERTIFICATE OF CORRECTION

PATENT NO. : 4,812,030

DATED : March 14, 1989

INVENTOR(S) : George T. Pinson

It is certified that error appears in the above-identified patent and that said Letters Patent is hereby corrected as shown below:

TITLE PAGE

Under References Cited, Document No. 3,915,557, change "10/1979" to --10/1975--.

IN THE SPECIFICATION:

Column 2, line 57, change "reversable" to --reversible--.

Column 4, line 35, "The focal length" should begin a new paragraph.

Column 5, line 28, change "FIGS." to --FIG.--.

Column 6, line 50, change "removeably" to --removably--.

Column 7, line 10, change "Preferrably" to --Preferably--.

IN THE CLAIMS:

Claim 1, line 3, after "set" delete the comma.

Claim 4, line 3, after "means." delete --5--.

UNITED STATES PATENT AND TRADEMARK OFFICE
CERTIFICATE OF CORRECTION

PATENT NO. : 4,812,030

DATED : March 14, 1989

INVENTOR(S) : George T. Pinson

It is certified that error appears in the above-identified patent and that said Letters Patent is hereby corrected as shown below:

Claim 6, line 5, after "to" delete the comma.

Signed and Sealed this

Twentieth Day of June, 1989

Attest:

DONALD J. QUIGG

Attesting Officer

Commissioner of Patents and Trademarks